United States Patent [19]

Hartung et al.

[11] Patent Number: 5,745,178
[45] Date of Patent: Apr. 28, 1998

[54] GLOBAL RATE CONTROL FOR MODEL-ASSISTED CODING OF LOW BIT RATE VIDEO

[75] Inventors: John Hartung, Warren, N.J.; Arnaud Eric Jacquin, New York, N.Y.; Jonathan David Rosenberg, Morganville, N.J.

[73] Assignee: Lucent Technologies Inc., Murray Hill, N.J.

[21] Appl. No.: 589,660

[22] Filed: Jan. 22, 1996

[51] Int. Cl.⁶ .......................... H04N 7/12; H04N 11/02; H04N 11/04
[52] U.S. Cl. ............................ 348/405; 382/251
[58] Field of Search ........................ 348/405, 398, 348/420; 382/251

[56] References Cited

U.S. PATENT DOCUMENTS

| | | | |
|---|---|---|---|
| 4,969,040 | 11/1990 | Gharavi | 358/136 |
| 5,446,495 | 8/1995 | Tourtier et al. | 348/398 |
| 5,487,119 | 1/1996 | Kimura et al. | 348/405 |
| 5,515,388 | 5/1996 | Yagasaki | 348/405 |
| 5,542,008 | 7/1996 | Sugahara et al. | 348/405 |
| 5,552,829 | 9/1996 | Kim et al. | 348/405 |

OTHER PUBLICATIONS

G. Keesman, I. Shah and R.Klein–Gunnewiek, "Bit–Rate Control For MPEG Encoders", *Signal Processing: Image Communication 6*, 1995, pp. 545–560.

Y. Shoham and A. Gersho, "Efficient Bit Allocation For An Arbitrary Set Of Quantizers", *IEEE Transactions On Acoustics, Speech, And Signal Processing*, vol. 36, No. 9, Sep. 1988, pp. 1445–1453.

K. Ramchandran, A. Ortega and M. Vetterli, "Bit Allocation For Dependent Quantization With Applications To MPEG Video Coders", *Proc. Internat. Conf. Acoust. Speech Signal Process. 1993*, Minneapolis, Mar. 1993, pp. V381–V384.

A. Ortega, K. Ramchandran and M. Vetterli, "Optimal Trellis–Based Buffered Compression And Fast Approximations", *IEEE Transactions On Image Processing*, vol. 3, No. 1, Jan. 1994, pp. 26–40.

"Video Coding For Low Bitrate Communication", *Draft ITU–T Recommendation H.263*, Dec. 5, 1995.

*Primary Examiner*—Amelia Au
*Assistant Examiner*—Nhon T. Diep
*Attorney, Agent, or Firm*—Kenneth M. Brown

[57] ABSTRACT

A method and apparatus for coding an image comprising (at least) two regions (e.g., a facial region and a background region) which are to be coded with different quantization error parameters (e.g., quantizer step sizes), wherein the respective quantization error parameters are determined with use of a feed-forward rate control technique. Initial quantization error parameters are assigned to each region, and the overall bit rate which would result for the coding of the given frame is computed based on these assigned quantization error parameters. The computed bit rate is compared to a given bit rate constraint which may, for example, represent a limitation of a transmission channel. Based on the result of this comparison, one or both of the assigned quantization error parameters are adjusted, thereby resulting in different quantization error parameters for the two regions. For example, if the computed bit rate exceeds the given bit rate constraint, at least one of the quantization error parameters is advantageously adjusted in a direction which results in the use of fewer coding bits (e.g., a coarser quantization). If the given bit rate constraint exceeds the computed bit rate, at least one of the quantization error parameters is advantageously adjusted in a direction which results in the use of more coding bits (e.g., a finer quantization resulting in a higher coding quality). Finally, each of the regions is coded based on the correspondingly assigned quantization error parameters.

24 Claims, 4 Drawing Sheets

FIG. 4
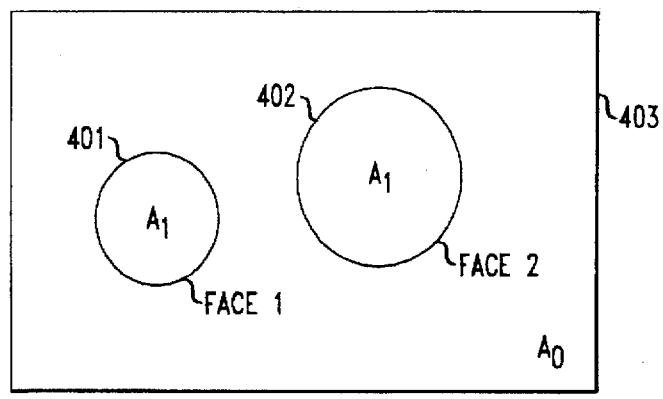
FIG. 5
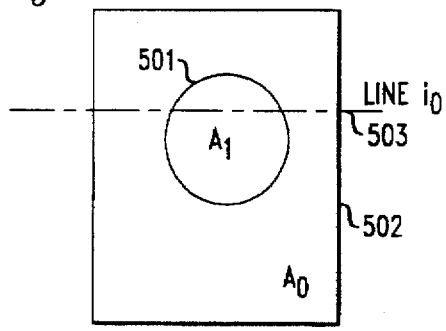
FIG. 6
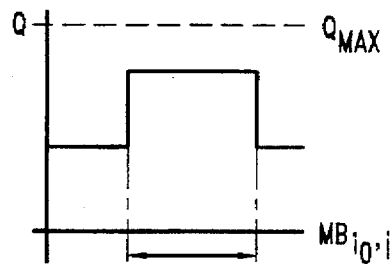
FIG. 7
| DIFFERENTIAL VALUE | DQUANT |
|---|---|
| 2 | 0000 |
| 4 | 0001 |
| 6 | 0010 |
| 8 | 0011 |
| 10 | 0100 |
| 12 | 0101 |
| 14 | 0110 |
| 16 | 0111 |
| -2 | 1000 |
| -4 | 1001 |
| -6 | 1010 |
| -8 | 1011 |
| -10 | 1100 |
| -12 | 1101 |
| -14 | 1110 |
| -16 | 1111 |

GLOBAL RATE CONTROL FOR MODEL-ASSISTED CODING OF LOW BIT RATE VIDEO

FIELD OF THE INVENTION

The present invention relates to the field of video signal coding and more particularly to the coding of video signals for use in video communications at low bit rates.

BACKGROUND OF THE INVENTION

The coding of video signals for efficient transmission and/or storage has received a great deal of recent attention, particularly with the growing interest in technologies such as HDTV (High Definition Television) and Interactive Television (e.g., "video-on-demand"). In fact, video coding algorithms have been standardized for many of these applications (including, e.g., Motion Picture Experts Group standards such as MPEG-1 and MPEG-2). These applications, however, typically involve the coding of video signals at relatively high bit rates.

At low bit rates, such as are used in video teleconferencing and video telephony applications, coding artifacts are often present throughout the coded images. These artifacts result from the fact that having a low number of bits available to code each frame reduces the quality of the coding that can be performed. Typically, the artifacts tend to affect various areas of the image without discrimination. Viewers, however, tend to find coding artifacts to be much more noticeable in areas of particular interest to them. In typical video teleconferencing or telephony applications, for example, the viewer will tend to focus his or her attention to the face(s) of the person(s) on the screen, rather than to other areas such as clothing and background. Moreover, even though fast motion in a coded image is known to mask coding artifacts, the human visual system has the ability to "lock on" and "track" particular moving objects in a scene, such as a person's face. For the above reasons, communication between users of very low bit rate video teleconferencing and telephony systems tend to be more intelligible and psychologically pleasing to the viewers when facial features are not plagued with too many coding artifacts.

In "Model-Assisted Coding of Video Sequences at Low Bit Rates" by A. Eleftheriadis and A. E. Jacquin, application Ser. No. 08/250,251, filed on May 27, 1994 and assigned to the assignee of the present invention, it was recognized that in video teleconferencing and telephony applications, for example, the coding quality of certain regions of a video image (e.g., those containing a predetermined object such as a person's face) is significantly more important than the coding quality of other areas of the scene. In particular, and in accordance with an illustrative embodiment of the invention disclosed therein, a region of an image which includes a predetermined object such as a person's face may be automatically determined by comparing one or more predetermined (geometric) shapes (e.g., ellipses of various dimensionality) with the shapes of objects found in the image. That is, the predetermined object is "modelled" by a set of one or more geometric shapes. When a good "match" is found, it may be presumed that the object in the image is, in fact, the predetermined object (e.g., a person's face). The determined region, presumed to include the predetermined object, may then be coded with, for example, a higher quality coder than might be used for coding other areas of the image. "Model-Assisted Coding of Video Sequences at Low Bit Rates" is hereby incorporated by reference as is fully set forth herein.

In video coding applications based on the well known Motion-Compensated Discrete Cosine Transform (MC-DCT) technique, a "rate control module" is responsible for assigning quantizers or quantization levels (in the case of uniform scalar quantization) to image blocks, given a bit budget. Such rate control algorithms are usually classified in two broad classes: feed-backward and feed-forward algorithms. (See, e.g., "Bit-rate control for MPEG encoders," by G. Keesman, I. Shah, R. Klein-Gunnewiek, Image Communication, vol. 6, pp. 545–560, 1995.) In feed-backward rate control, a limited knowledge of the relation between quantizer step size and bit rate is available. A buffer is used to regulate quantization as in the H.261 standard (Reference Implementation RM8), and as described in "Model-Assisted Coding of Video Sequences at Low Bit Rates." This approach can result in fluctuations in image quality which are especially undesirable within a region of interest such as a facial region. In feed-forward rate control, the exact relation between a quantizer step size and bit rate is assumed to be available. Based on this relation, an optimal bit allocation can, in theory, be computed exactly. However, this relation is usually obtained at the expense of an extensive analysis phase involving considerable trial-and-error. Algorithms in this class are therefore usually deemed too complex for practical implementations.

SUMMARY OF THE INVENTION

The present invention provides a method and apparatus for coding an image (e.g., a frame of a video sequence) comprising (at least) two regions (e.g., a facial region and a background region) which are to be coded with different quantization error parameters (e.g., quantizer step sizes), wherein the respective quantization error parameters are determined with use of a feed-forward rate control technique. Specifically, in accordance with an illustrative embodiment of the present invention, initial quantization error parameters are assigned to each region, and the overall bit rate which would result for the coding of the given frame is computed based on these assigned quantization error parameters. The computed bit rate is compared to a given bit rate constraint which may, for example, represent a limitation of a transmission channel. Based on the result of this comparison, one or both of the assigned quantization error parameters are adjusted, thereby resulting in different quantization error parameters for the two regions. For example, if the computed bit rate exceeds the given bit rate constraint, at least one of the quantization error parameters is advantageously adjusted in a direction which results in the use of fewer coding bits (e.g., a coarser quantization). If, on the other hand, the given bit rate constraint exceeds the computed bit rate, at least one of the quantization error parameters is advantageously adjusted in a direction which results in the use of more coding bits (e.g., a finer quantization resulting in a higher coding quality). Finally, each of the regions is coded based on the correspondingly assigned quantization error parameters.

In one illustrative embodiment of the present invention, the modification of the one or more assigned quantization error parameters is performed by an iterative process whereby the parameter assigned to one of the regions is adjusted until either the result of the aforementioned comparison changes (to approximate equality), or until either parameter reaches a limiting value. The limiting value may comprise a predetermined maximum or minimum value, or it may be based on a predetermined maximum allowable difference between the values of the quantization error parameters for the two regions. In particular, if the computed bit rate exceeds the given bit rate constraint, the quantization error parameter of the background region may be advantageously adjusted in a direction which results in the use of fewer coding bits (e.g., a coarser quantization), whereas if the given bit rate constraint exceeds the computed bit rate, the quantization error parameter of the facial region may be advantageously adjusted in a direction which results in the use of more coding bits (e.g., a finer quantization). In this manner, a high coding quality in the facial region will be maintained wherever possible in view of the bit rate constraint.

In the case where the quantization error parameter reaches a limiting value, the parameter assigned to the other region is then advantageously adjusted iteratively (either alone, or alternately along with the parameter assigned to the first region in the case that the limiting value was based on a predetermined maximum allowable difference therebetween), until the result of the comparison changes (to approximate equality). In this manner, the highest quality coding possible is produced in the facial region, while the constraints of the available bit rate, the minimum and maximum acceptable levels of quantization, and, if applicable, the predetermined maximum allowable difference between the parameters are all met simultaneously therewith.

BRIEF DESCRIPTION OF THE DRAWINGS

FIG. 4 shows an illustrative segmentation of an image into a facial region (a region-of-interest) and a non-facial region.

FIG. 5 shows an example of an identified region-of-interest in an illustrative input image, with a horizontal line of image macroblocks shown traversing the region-of-interest.

FIG. 6 shows an illustrative quantization profile corresponding to the example of FIG. 5 which may be used in an illustrative embodiment of the present invention.

FIG. 7 shows an example of a differential quantization (DQUANT) table with differential quantization values and DQUANT codes which may illustratively be used to encode such values.

DETAILED DESCRIPTION

Introduction

Figure 1:
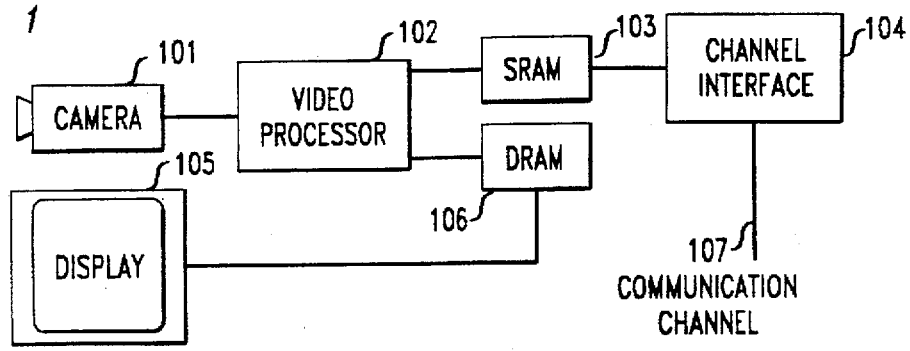
FIG. 1 illustrates a block diagram of an illustrative system for compressing video data which may be employed in accordance with the present invention.

FIG. 1 depicts an illustrative system for compressing video data which may be employed in accordance with the present invention. Camera 101 captures video data and transfers it to video processor 102. The video processor, using software stored in SRAM 103, may be used to implement a compression algorithm in accordance with certain illustrative embodiments of the present invention. The final compressed bitstream may, for example, be stored in SRAM 103 from which Channel Interface 104 reads the compressed data and maps it onto communications channel 107. At the same time, the system decompresses the data and stores the results in DRAM 106 for display on display unit 105.

Figure 2:
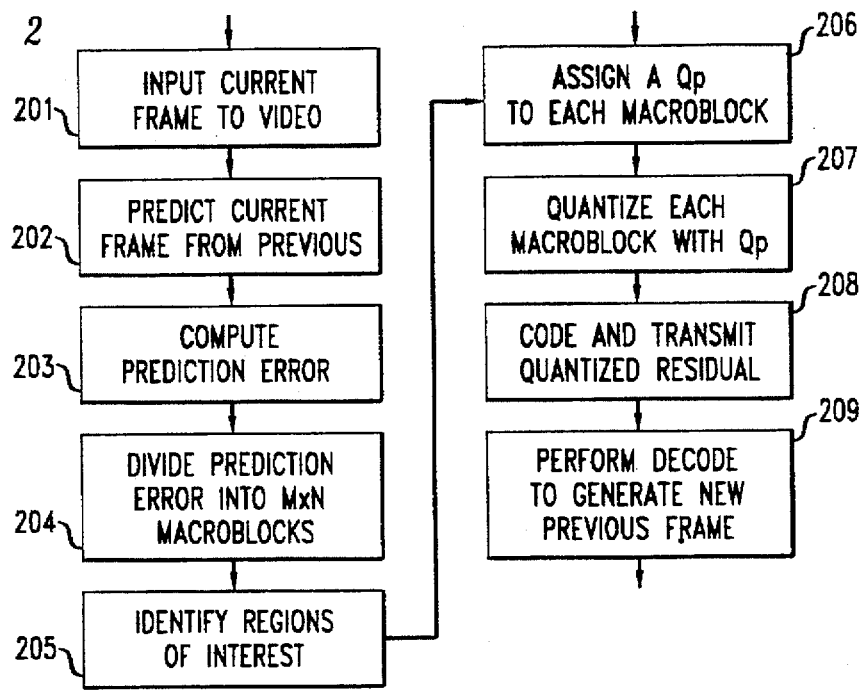
FIG. 2 illustrates a flow diagram of an illustrative method for compressing video in accordance with the present invention, as may, for example, be implemented in video processor 102 of the illustrative system of FIG. 1.

FIG. 2 illustrates a flow diagram of one illustrative method for compressing video in accordance with the present invention, as may, for example, be implemented in video processor 102 of the illustrative system of FIG. 1. In block 201, the frame of video to be compressed is read from memory. In block 202, the frame is predicted from the previous frame using conventional motion estimation techniques. In block 203, the difference from the predicted frame and the frame to be transmitted (the "residual") is computed. In block 204, the residual is broken into a rectangular array of M by N macroblocks, each illustratively of size 16 by 16 pixels. In block 205, a region of interest is identified (such as, for example, a face, hands, important objects, etc.), and the macroblocks are divided into two groups—those belonging to the region of interest, and those not in the region of interest. The region of interest may be defined, for example, as the facial area as identified by techniques such as those described in "Model-Assisted Coding of Video Sequences at Low Bit Rates."

In block 206, the rate control function, which operates according to the principles of the present invention, assigns a quantization error parameter which illustratively comprises a quantization step size (also sometimes referred to merely as a "quantizer"), $Q_p$, to each macroblock. In block 207, the actual quantization is performed. In block 208, the quantized blocks are coded and transmitted to the decoder. In block 209, the decode operation (i.e., essentially the same operation as is performed by the decoder) is performed to generate a new reconstructed image, which will subsequently be used as the previous frame in the predictive coding of the next frame.

A First Illustrative Embodiment

Figure 3:
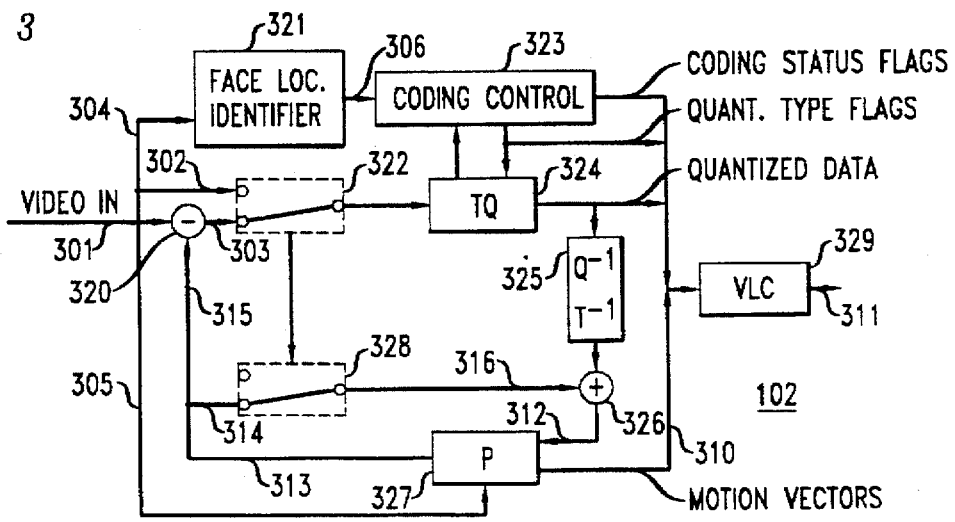
FIG. 3 shows a block diagram for an illustrative low bit rate video source coder based on Motion-Compensated Discrete Cosine Transform (MC-DCT) techniques.

FIG. 3 shows a block diagram for an illustrative low bit rate video source coder based on conventional Motion-Compensated Discrete Cosine Transform (MC-DCT) techniques, such as those complying with ITU-T Recommendation H.263 for video coding at rates below 64 kbps (kilobits per second). (See ITU-T Study Group 15, "Draft recommendation H.263: Video coding for low bitrate communication," Dec. 5, 1995.) The illustrative coder of FIG. 3 may, for example, be used in the implementation of video processor 102 of the illustrative system of FIG. 1. A face tracking module such as the one described in "Model-Assisted Coding of Video Sequences at Low Bit Rates" may be used to implement face location identifier 321 to provide face location information to coding control module 323, which, inter alia, performs rate control in accordance with this first illustrative embodiment of the present invention.

Specifically, a current original video image is provided as input to the illustrative source coder of FIG. 3 along line 301 and to the first input of switch 322 along line 302. The motion-compensated previous reconstructed frame is available at the output of prediction memory 327 and is fed to differencer 320 along lines 313 and 315. A motion-compensated difference image is formed at the output of the differencer 320 and is fed to the second input of switch 322 along line 303. For each image macroblock, illustratively scanned in a zigzag fashion from the upper-left to the lower-right corner of the image, coding control module 323 determines whether it is more advantageous to code the image block in "intra" mode (i.e., by computing DCT coefficients for the image block itself), in which case switch 322 is placed in the upper position, or in "inter" mode (i.e., by computing DCT coefficients for a motion-compensated image residual available at the output of differencer 320), in which case switch 322 is placed in the lower position. Switch 328 is synchronized with switch 322 and is therefore subjected to the same control. The data block at the output of switch 322 is transformed and quantized by transform and uniform quantization module 324, with the quantization step size controlled in accordance with this first embodiment of the present invention by coding control module 323. (Note that the use of both "intra" and "inter" coding techniques are well known to those skilled in the art.)

The quantized DCT coefficients output by quantizer 324 are also used to reconstruct the next motion-compensated previous reconstructed frame on lines 313 and 315. They are first inverse quantized and inverse transformed by inverse quantization and inverse transform module 325. If the data was coded in "intra" mode (switch 328 in the upper position), the inverse transformed data is directly written into prediction memory 327 as reconstructed data. If the data was coded in "inter" mode (switch 328 in the lower position), the inverse transformed data is first added to motion-compensated data from the previous reconstructed frame on line 313, 314 and 316, by adder 326. In both cases, reconstructed (or encoded) data for the current frame is available at the output of adder 326. Prediction memory 327 computes motion vectors for the current original image and writes those motion vectors into the bitstream on line 310. The bitstream data corresponding to block coding status, quantization type, quantizer coefficients, and motion vectors, are each variable length coded (VLC) by variable length coder 329 and are transmitted to the communication channel on line 311. (Variable length coding techniques, such as, for example, Huffman coding and arithmetic coding, are conventional lossless coding techniques well know to those of ordinary skill in the art.)

As pointed out above, face location identifier 321, may, for example, comprise a system such as the one described in "Model-Assisted Coding of Video Sequences at Low Bit Rates." Such a system identifies elliptical head outlines and rectangular facial areas containing the eyes, nose and mouth of people present in the video images to encode. Face location information is sent to coding control 323 via line 306. In cases where more than one person's head has been located by face location identifier 321 in the current image to encode, all facial areas may be treated as one region-of-interest $A_1$, which may actually comprise two or more disconnected region portions 401 and 402 as illustratively shown in FIG. 4. The complementary image region $A_0$ (region 403) may be referred to as the "non-face region" or, for the sake of simplicity, the "background," even though it typically includes scene background as well as other scene elements such as clothing, arms, hands, etc.

As in ITU-T Recommendation H.263, quantization update information which tells the quantizer which quantization step to use for each data block is transmitted differentially, where the differential quantization (DQUANT) values are selected among a table made available both to the encoder and decoder. Although the H.263 standard uses a small 4 entry table, the illustrative embodiments of the present invention may advantageously use a larger table, such as, e.g., one comprising $2^n$ entries, provided it is made available to both the encoder and its corresponding decoder. Illustratively, a 4-bit (i.e., size $2^4$) table representing 16 even values of DQUANT, uniformly spread in the range from −16 to +16, may be advantageously used, since it allows sufficient flexibility for model-assisted rate control in accordance with various illustrative embodiments of the present invention to work effectively. Such an illustrative table is shown, for example, in FIG. 7, where the left column lists the differential quantization values and the right column lists the DQUANT codes used to encode these values in the bitstream.

Constant Frame Rate (CFR) Rate Control

In a constant frame rate mode of operation, input video frames are encoded at a predefined, fixed frame rate—typically 7.5 or 5 fps (frames per second) when coding is to be performed at coding rates below 25.6 kbps (kilobits per second). The number of bits available per frame, referred to as the "bit budget" per frame, is simply obtained by dividing the video bit rate by this fixed frame rate.

FIG. 5 shows an example of an identified region-of-interest (e.g., a head or face outline) in an illustrative input image, with a horizontal line of image macroblocks traversing the region-of-interest. In particular, the horizontal line of image macroblocks, line 503, is indexed by integer index $i_0$, and traverses the identified region-of-interest, region 501 (as well as the background, region 502). In FIG. 6, an illustrative example of a corresponding desired quantization profile is shown, where a measure of block coding quality Q is plotted as a function of macroblock number along horizontal line $i_0$ of the macroblocks. The two numerical values which define the plateau in this profile may be advantageously required to remain the same when scanning lines of image blocks from top to bottom. Of course, the extent of the plateau varies as the horizontal line of macroblocks moves from top to bottom (and where no region of interest is traversed by the horizontal line, the plateau may, for that particular horizontal line, be non-existent). In this manner, uniform coding quality may be maintained both within the region of interest and also in the background (albeit at a lower quality). The measure of block coding quality may be, for example, related to the quantization step size, $Q_p$, used to uniformly quantize the image block by the illustrative relation $$Q = Q_{max} - Q_p,$$

where $Q_p$ may, for example, be an integer between 1 and 31 (representative of the selected quantizer step size), and where $Q_{max}$ equals 32. In this case, the goal of the rate control algorithm is, for each input frame, to arrive at two specific numerical values of the quantization step size $Q_p$ referred to as $Q_i$ (for the interior or facial region) and $Q_e$ (for the exterior or background region), respectively, which two values entirely define the plateau.

Figure 8:
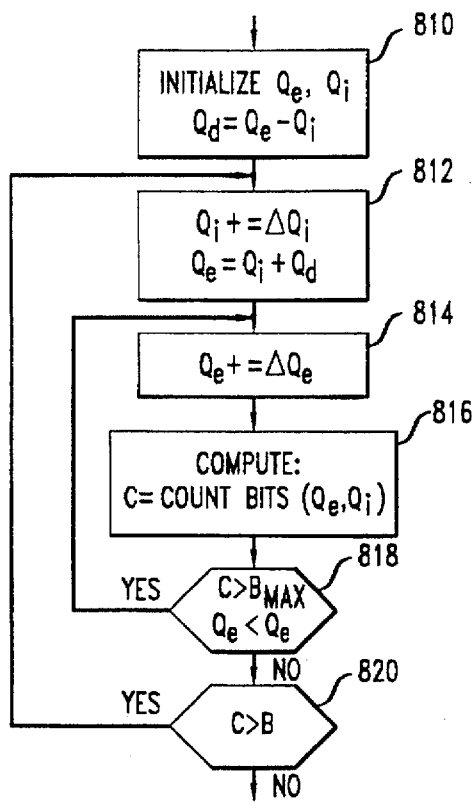
FIG. 8 shows a flow diagram of a global model-assisted rate control method in accordance with a first illustrative embodiment of the present invention.

FIG. 8 shows a flow diagram of a global model-assisted rate control method in accordance with a first illustrative embodiment of the present invention. As shown in the figure, this first illustrative embodiment of the global model-assisted rate control method comprises two embedded loops. The inner loop comprises increment module 812 for the exterior region, bit budget computation module 816 and test 818. The outer loop comprises the inner loop with, in addition, increment module 812 for the interior region with the exterior region reset, and test 820. The function "count-bits" invoked in bit budget computation module 816 computes the number of bits required to encode a current predicted frame given the quantization parameters $Q_i$ (for blocks in the facial region) and $Q_e$ (to be used for background blocks). In this illustrative embodiment, relatively small initial values of $Q_i$ and $Q_e$ are specified in initialization module 810. These values are chosen such that their difference is a valid entry in the DQUANT Table of FIG. 7. The inner loop gradually increases the parameter $Q_e$ by an increment $\Delta Q_e$ such that the difference $Q_e-Q_i$ is the next positive entry (reading the DQUANT Table of FIG. 7 from top to bottom) until it reaches a pre-specified (relatively large) maximum value $Q_e^{max}$ or until the bit budget is met. The outer loop gradually increases both parameters $Q_i$ and $Q_e$ by the same small increment (e.g., one), until the bit budget is met.

Variable Frame Rate (VFR) Rate Control

For "head-and-shoulders" video material coded at a very low bit rate, it is advantageous to use a constant frame rate type rate control in order to achieve good lip-synchronization. However, for more complex video material (e.g., material including moving backgrounds and/or scene changes), it may be difficult to maintain fixed frame rate encoding. That is, the method as described above might not always converge to a bit count within the budget. In such a case, it is advantageous to be able to resort to a variable frame rate variant of the above method.

Figure 9:
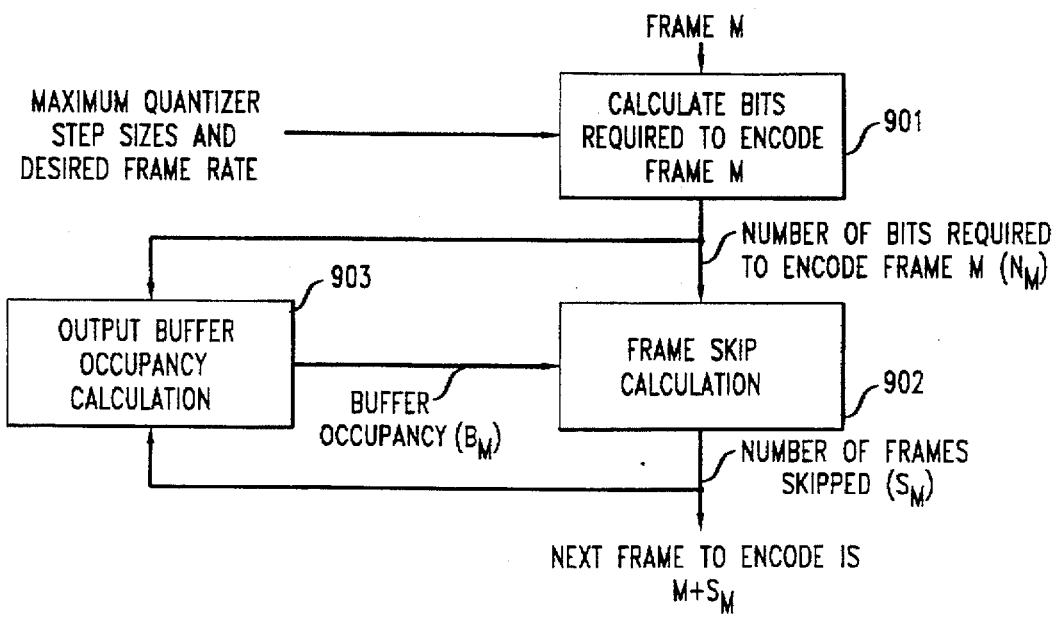
FIG. 9 shows a block diagram of an illustrative enhancement to the global model-assisted rate control algorithm in accordance with the first illustrative embodiment of the present invention as shown in FIG. 8, the enhancement providing for variable frame rate type rate control.

FIG. 9 shows a block diagram of an illustrative enhancement to the global model-assisted rate control algorithm in accordance with the first illustrative embodiment of the present invention as shown in FIG. 8, the enhancement providing for variable frame rate type rate control. Variable frame rate control works in combination with the global rate control method described above. Maximum quantizer step sizes and a target frame rate are initially used to encode each frame based on the illustrative global bit allocation process as described above, modifying the quantizer step sizes as needed to meet those objectives (module 901). The number of frames ($S_M$) needed to transmit the generated encoding bits, plus any bits in excess of the output buffer target occupancy ($B_{target}$), are then calculated by module 902 according to the equation $$S_M = \lfloor ((B_M - B_{target}) + N_M) \times 30/C,$$

where $\lfloor$ denotes the integer part of the calculation, C is the channel bitrate, $N_M$ is the number of bits required to code the current frame (i.e., frame M), $B_M$ is the buffer occupancy, and where the input sequence is assumed to have been sampled at 30 frames per second.

As long as consecutive frames can be encoded at the required channel rate and within the maximum quantizer step size values, the sequence is coded at the desired constant frame rate. When the target bitrate cannot be met at the maximum quantizer step size values, however, the VFR procedure adjusts the number of frames to be skipped as needed to accommodate the transmission of the additional bits in that frame. An output buffer is maintained to compensate for the coarse control of the instantaneous rate by frame skipping. Additional or fewer encoding bits are provided by skipping frames which occur at 30 frames per second. Therefore, the actual rate is advantageously modified in steps equal to the total bitrate divided by 30. The illustrative VFR procedure advantageously generates a frame skip which maintains a target output buffer occupancy so that there are always bits to be transmitted at a constant coding rate. The buffer occupancy is calculated by module 903 based on the equation $$B_N = B_M + N_M - S_M \times C/30,$$

where $N = M + S_M$. (Note that since $S_M$ is the number of frames skipped, frame N is the next frame to encode after frame M.) The use of this buffer adds at most 33 ms of delay given an input frame rate of 30 frames per second.

A Second Illustrative Embodiment

A second illustrative embodiment of a rate control procedure in accordance with the present invention operates by trying a variety of different quantizers in the facial and non-facial regions, starting with the coarsest quantization (and thus the lowest bit rate), and gradually decreases the coarseness (thus increasing the bit rate) until it finds the set of quantizers which causes the rate to just exceed the target (and thereby approximately equals the target). The first step in this second illustrative embodiment may be referred to as "pre-quantization." In particular, it is computationally advantageous to move as much computation out of the main loop as possible. That is, computations are only done once if it is possible to do so. For example, the DCT is computed for each macroblock (whether it be "intra" or "inter" coded), and each coefficient is divided by two. The division by two is performed because each quantizer results in the division of each coefficient by $2Q_p$. Thus, the division by two may be advantageously performed ahead of time. After this division, the largest coefficient is noted and stored.

Both the facial and non-facial (i.e., background) regions are divided into strips which correspond to the macroblock structure. In addition, of the 31 available quantizers, up to eight are selected for use. The eight which are chosen is a function of the largest quantizer desired, which can range from 1 to 31. Initially, the non-facial region is assigned the largest (i.e., coarsest) quantizer, and the facial area is assigned the next smallest quantizer. Then, if it is determined that the bit rate required for the use of these quantizers is less than the target bit rate for the frame, the quantizers are decreased.

Specifically, the quantizers are decreased in steps. In each step, the decrease occurs in either the facial or non-facial region, and in each region, only the macroblocks in a single strip have their quantizers decreased in a given step. By changing the quantizers on a strip-by-strip basis, high accuracy in meeting a target bit rate will result. (If the quantizers could be changed only on a region-based granularity, the change in rate for a single step in the quantizer value might in some cases be quite large.)

The quantizers are first adjusted in the bottom-most strip, and then are adjusted for each strip above it, in turn. For example, if the facial region were initialized with a quantizer of 17, for example, and the non-facial region were initialized with a quantizer of 19, then if the rate were determined to be below the target rate, the macroblocks in the facial region which lie on the bottom-most group of blocks will have their quantizer reduced to 15. Then, the next row of facial blocks would have their quantizers reduced to 15, so that now the bottom two rows have all facial blocks using a quantizer of 15, and so forth.

Once all of the rows in a given region have had their quantizers decreased, the process begins again at the bottom of the picture. At each pass through the picture, the decision to decrease the quantizers in the facial or non-facial region is based on a simple finite state machine (FSM). (The use of FSM-based implementations is well known to those skilled in the art.) The FSM maintains a "rubber-band" like relationship between the quantizers used in the facial and non-facial regions. It attempts to keep the facial quantizer below the non-facial quantizer, subject to a desired distance and the largest allowable distance as may be defined by the standard. When the distance becomes too large, the non-facial quantizers are decreased until they get too close to the facial quantizers, at which point the facial quantizers are decreased. The FSM exits when both quantizers have reached the minimum values. In this case, the sequence is too simple to be coded even with the smallest quantizers, without, for example, increasing the frame rate. Note that the structure of the above-described FSM is such that a maximum of 2N state changes can occur before the machine exits, where N is the number of quantizers in use (which, as described above, may be advantageously limited to eight or less). This results in a guaranteed upper bound on convergence time.

A great deal of computational savings may be obtained by determining the largest coefficient in the pre-quantization stage as noted above. For a given quantizer, if the largest coefficient is N, then it is known that all coefficients will be zero if the quantization step size is larger than N, given that the quantization is performed by division with truncation. One advantage of this information is that variable length coding (such as zigzag RLA coding and entropy coding, each familiar to those skilled in the art) does not need to be performed on any block whose largest coefficient was smaller than the quantization step size. For large quantizers, this implies that little computation will typically need to be performed. The procedure can quickly converge upon the quantizers which begin to increase the rate beyond the minimum.

The combination of the above-described FSM, a restriction to at most eight quantizers, and the predetermination of the largest coefficient combine to advantageously reduce the computational requirements of the rate control process in accordance with this second illustrative embodiment of the present invention. Such an efficient implementation allows the procedure to be executed in real time.

In addition, since the process of rate control needs only to determine the bit rate for each block, and not the actual Huffman codes which would be used to code them, an efficient method for storing the rate table may be employed when coding in accordance with the H.263 standard. In particular, after quantization, each DCT coefficient is clipped to 16. Careful examination of the H.263 table for coding RLA coefficients shows that no Huffman code exists for any amplitude larger than 12. In those cases, the RLA token is escape coded, which requires 22 bits (independent of the amplitude). Thus, for each run, a table with 16 entries may be computed, corresponding to the rate for an amplitude with a value from 1 to 16. Each entry either comes from the Huffman table, if the given run/amplitude pair is Huffman coded, or it is 22 for the escape coding case. This table is advantageously small and easily accessed, allowing for a further speed up of the computation.

Figure 10:
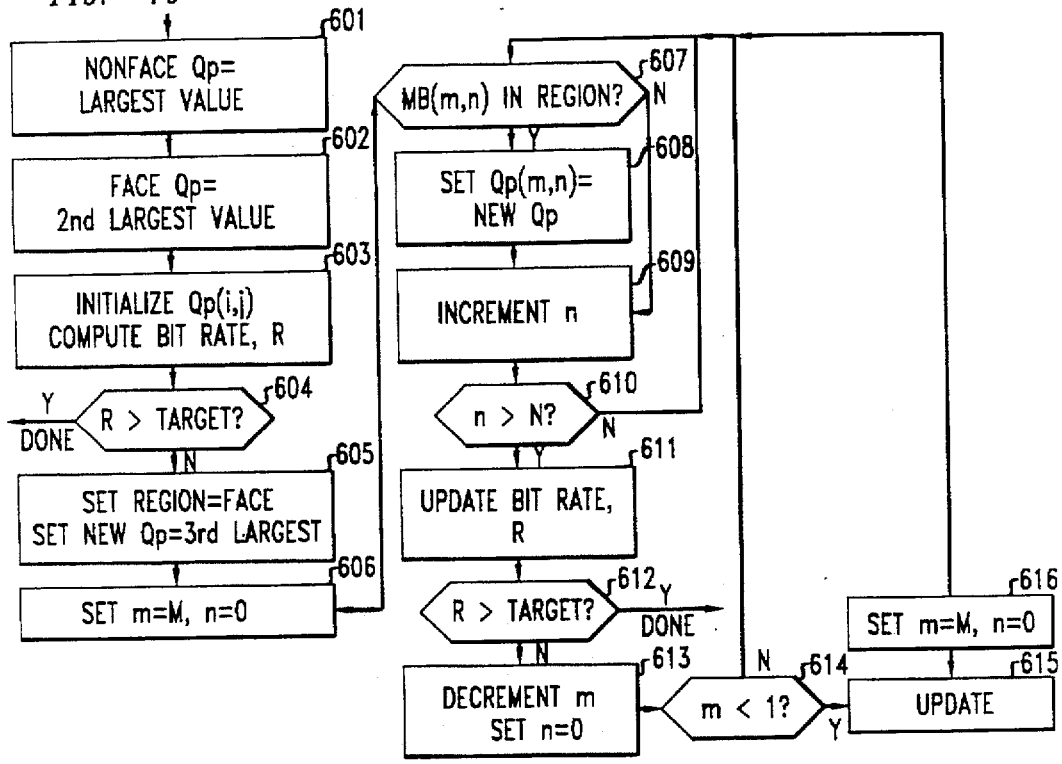
FIG. 10 shows a flow diagram of a method for performing global model-assisted rate control in accordance with a second illustrative embodiment of the present invention.

FIG. 10 is a flow diagram which illustrates how rate control may be performed in accordance with this second illustrative embodiment of the present invention. The macroblocks to be quantized and transmitted to the decoder are arranged in an M by N grid. Let MB(i,j) refer to the macroblock in the i'th row and the j'th column. Similarly, let $Q_p(i,j)$ be the quantizer assigned to macroblock MB(i,j). The macroblocks are divided into two groups—those in the facial region and those in the non-facial region. Three additional parameters are also defined: FACE Qp, NONFACE Qp, and NEW Qp. An ordered list of allowable values for these three parameters, is also defined. Two restrictions may be advantageously imposed on this list. First, each element of the list is an allowable quantizer in accordance with the compression standard being used. For example, in the H.263 standard, values of 1 to 31 are permitted. And second, the compression standard allows any two adjacent macroblocks to have quantizers which are "neighboring" elements in the set, where the required "neighborhood" is defined by the standard. For example, in the H.263 standard, the difference in the magnitude of the quantizers used in two adjacent macroblocks is required to be less than three.

The goal of the illustrative method described herein is to assign to each macroblock a quantizer, $Q_p(i,j)$, which is an element of the ordered list of allowable values, such that three conditions are met:

(a) the bit rate required to code the frame using the assigned set of $Q_p(i,j)$ is close to (but slightly above) some desired target bit rate;

(b) macroblocks in the facial region have assigned quantizers which are less than or equal to the quantizers assigned to the macroblocks in the non-facial region; and (c) each region (facial or non-facial) is either uniformly quantized, or else the region is divided into two parts along a single horizontal boundary, and each of these two parts is uniformly quantized.

The above three constraints define the desired "quantization profile" for the given frame (i.e., the image to be coded). The illustrative procedure operates by adjusting all of the values of $Q_p$ in a single line of macroblocks at a time, adjusting either the macroblocks in the facial or non-facial region only. The procedure illustratively starts with the largest possible values of $Q_p(i,j)$, and then gradually decreases these values until the required bit rate (barely) exceeds the target bit rate. One advantage of this direction of "attack" (as opposed to starting from a low $Q_p$ and working upwards) is that of computational savings. For very difficult to code frames, it is possible that even with the largest allowed $Q_p$, the frame cannot be coded with the available number of bits. In this case, decreasing the $Q_p$ will only make it worse, so the rate control procedure can immediately terminate and report that the given frame cannot be coded close to the target. (Or, alternatively, a variable frame rate scheme as described above may be employed, thereby increasing the available number of bits.) If, on the other hand, the procedure started from the other direction, a difficult frame would require the procedure to try every value of $Q_p$ until it hit the maximum, before it could in fact determine that the frame could not be coded with the available number of bits. This would require significantly more computation, especially since the frame is presumed to be a difficult one.

For simple frame sequences, however, the illustrative procedure described herein will have to perform many iterations before getting the $Q_p$ low enough to code the frame above the target. But such easy sequences usually have very few macroblocks which are actually coded, and thus the rate control procedure will typically operate more quickly on such sequences. In addition, easy sequences are also likely to result in more computation time being available to complete the coding process. Thus, although alternative embodiments of the present invention may operate in either direction, the approach employed by this second illustrative embodiment as described herein is likely to be more advantageous in terms of its computational requirements.

Specifically, with reference to FIG. 10, the illustrative procedure begins with block 601, assigning the quantizer having the largest allowable quantizer step size to the parameter NONFACE Qp, and in block 602, assigning the quantizer having the second largest allowable quantizer step size to FACE Qp. In block 603, all of the $Q_p(i,j)$ values are initialized. In particular, all macroblocks in the face region have their corresponding $Q_p(i,j)$ set to the value of FACE $Q_p$, and all macroblocks in the non-face region have their corresponding $Q_p(i,j)$ set to NONFACE $Q_p$. Then, R, the number of bits required to transmit the data with the given set of $Q_p$ values is computed. In block 604, this rate is compared against the target bit rate. If it is already above the target, then there is no way to further decrease the rate (since the quantizers are already at their maximum), and the procedure terminates. Otherwise, if the rate is below the target, execution continues with block 605.

In block 605, another variable, region, is set to the value FACE. Region takes on two values only—FACE or NONFACE—and it identifies the region which is currently having its quantizer step size reduced. In addition, the variable NEW $Q_p$ is set to the quantizer having the third largest allowable quantizer step size. In block 606, m and n, two more variables, are set to the values M and O, respectively. Variables m and n (together) point to the currently affected macroblock, and in block 606, are thereby set to point to the first macroblock in the last row.

In block 606, the (m,n)'th macroblock's classification (face or non-face), is compared against the value of region (which was initialized to FACE). If the macroblock is in the identified region, its Qp is set in block 608 to NEW Qp (which was initialized to the quantizer having the third smallest step size). Otherwise, it is passed over. In block 609, n is incremented, thus identifying the next macroblock in the row. In block 610, n is compared with N. If n is greater than N, the last macroblock in the row has just been examined, and flow continues to block 611. Otherwise, block 607 is executed again, this time to process the next macroblock.

In block 611, the rate, R, is updated based on the change in Qp for each macroblock in the m'th row. Since the Qp values in the row have decreased, the rate will have increased. Thus, the rate is compared once again against the target bit rate. If it is above the target bit rate, the procedure terminates. Otherwise, in block 613, n is reset to 0, and m is decremented by one, thereby pointing to the first macroblock in the row above the previously processed row. In block 614, m is compared against 1, to determine if the row which was just updated was the first row. If it was not, control returns to block 607, and the reduction of the Qp values (and thus the increase of the rate) continues.

Figure 11:
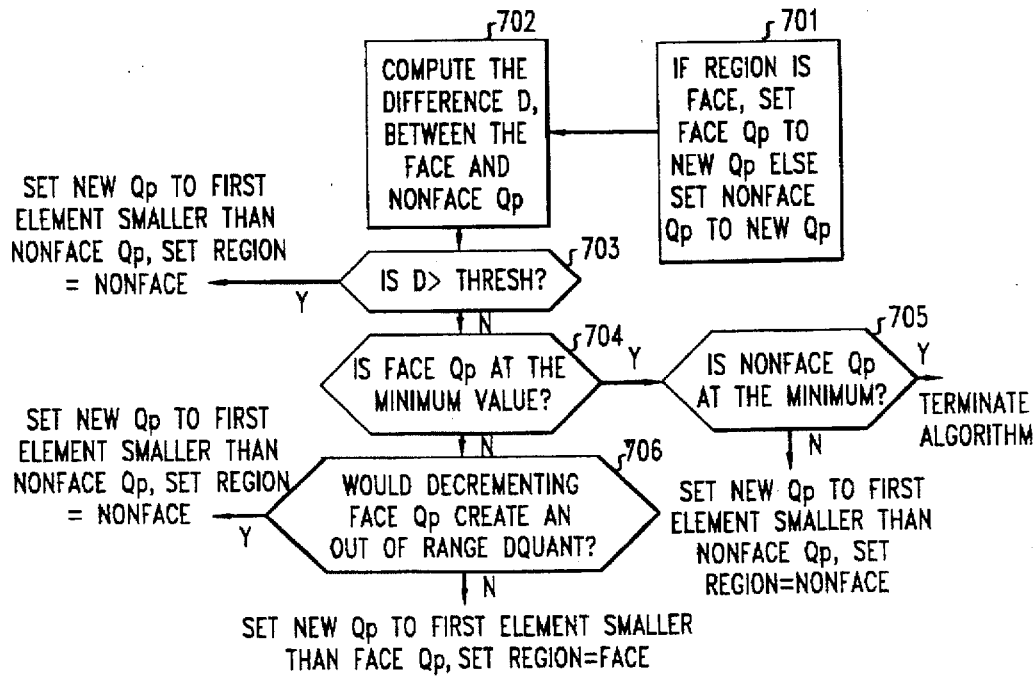
FIG. 11 shows an illustrative flow diagram for performing the update function of block 615 of the global model-assisted rate control method in accordance with the second illustrative embodiment of the present invention as shown in FIG. 10.

When control passes to block 615, all of the macroblocks in a region have had their Qp updated from either FACE Qp or NONFACE Qp to NEW Qp. At this point, these three values are updated. FIG. 11 shows an illustrative flow diagram for performing the update function of block 615. Once the update is complete, m and n are reset to the values M and O, respectively, and the process continues.

FIG. 11 shows the update function. The responsibility of the update function is to determine in which region to decrease the quantization—face or nonface. This comprises setting the region variable and choosing a value for NEW Qp. However, the value of NEW Qp is advantageously chosen so that the difference in quantization values between two adjacent macroblocks does not exceed the limit imposed by the compression standard.

The procedure begins in block 701, which sets FACE $Q_p$ to NEW $Q_p$ if the face region was just adjusted, and sets NONFACE $Q_p$ to NEW $Q_p$ if the non-face region was just adjusted. (Note that NEW $Q_p$ now represents the quantization parameter used for all macroblocks in the region that was just updated.) In block 702, the difference between FACE $Q_p$ and NONFACE $Q_p$ is computed. In block 703, if the difference is determined to be above a predetermined threshold, then the macroblocks in the face region have been (too) much more finely quantized than those in the non-face region. Thus, the non-face region macroblocks will have their quantizers reduced next. Otherwise, it is more advantageous to decrease the $Q_p$ in the face region, and flow accordingly continues to block 704.

In block 704, FACE $Q_p$ is compared to the smallest quantizer step size. If it has, in fact, reached the smallest value, the facial region $Q_p$ values cannot be reduced further. In that case, flow continues to block 705, where NONFACE $Q_p$ is compared against the minimum value. If it, too, has reached the smallest value, then both FACE Qp and NONFACE Qp have already reached the minimum values, and no further reductions can take place. Thus, the procedure terminates. If, on the other hand, NONFACE $Q_p$ has not reached the smallest value, then the non-face macroblocks will have their $Q_p$ values reduced in the next iteration.

If, as determined by block 704, FACE $Q_p$ has not reached the smallest value, control passes to block 706, where the largest value in the ordered list of allowable values which is less than FACE $Q_p$ is obtained and compared against NONFACE $Q_p$. If the difference, referred to in FIG. 11 as DQUANT, is larger than the standard allows, then the facial $Q_p$ values cannot be reduced further, so the non-facial $Q_p$ values are reduced instead. Otherwise (i.e., if the difference is allowed by the standard), the facial $Q_p$ values will be the next ones to be reduced.

For clarity of explanation, the illustrative embodiments of the present invention have often been presented herein as comprising individual functional blocks. The functions these blocks represent may be provided through the use of either shared or dedicated hardware, including, but not limited to, hardware capable of executing software. For example, these functions may be provided by a single shared processor or by a plurality of individual processors. Moreover, use of the term "processor" herein should not be construed to refer exclusively to hardware capable of executing software. Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the word "processor" as used herein. Thus, the above-described embodiments as well as any other illustrative embodiments in accordance with the present invention may be implemented as software executed on either general purpose or special purpose hardware processors, or, alternatively, may be implemented "directly" in either "off-the-shelf" or custom hardware (or a combination thereof), which may or may not include processors which execute software thereon.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

We claim:

1. A method of coding an image signal, the image signal representative of an image comprising a plurality of spatial regions, each spatial region comprising a bounded two-dimensional area of the image, each of the regions having one or more corresponding quantization error parameters associated therewith, the method comprising the steps of:

assigning a value to each quantization error parameter;

computing a coding bit rate for the image signal based on the values assigned to the quantization error parameters;

comparing the computed coding bit rate to a bit rate constraint;

adjusting the assigned value of at least one of said quantization error parameters based on the comparison, at least one of the quantization error parameters corresponding to each of at least two of the spatial regions having different resultant values thereby; and coding each of the spatial regions based on the values assigned to the corresponding quantization error parameters subsequent to the adjusting step.

2. The method of claim 1 wherein the coding step comprises coding with use of one or more scalar quantizers and wherein each of the quantization error parameters reflects a step size of a scalar quantizer.

3. The method of claim 2 wherein the assigning step comprises assigning a maximum value to at least one of the quantization error parameters.

4. The method of claim 2 wherein the assigning step comprises assigning a minimum value to at least one of the quantization error parameters.

5. The method of claim 1 wherein the coding step comprises coding each region with a substantially uniform quantization error.

6. The method of claim 1 wherein the coding step comprises coding a first portion of one of the regions with a first quantization error and coding a second portion of the one of the regions with a second quantization error, wherein the first quantization error and the second quantization error are unequal.

7. The method of claim 1 wherein the image signal is comprised in one frame of a sequence of frames, each of the frames comprising a corresponding image signal associated therewith, the method further comprising the steps of:

modifying the bit rate constraint based on the comparison step; and coding one or more other image signals in addition to the image signal, wherein the one or more other image signals are selected for coding based on the modification to the bit rate constraint.

8. The method of claim 1 wherein the adjusting step comprises the steps of:

(a) modifying the assigned value of one of the quantization error parameters;

(b) computing a modified coding bit rate for the image signal based on the values assigned to the quantization error parameters subsequent to the modifying step;

(c) comparing the computed modified coding bit rate to the bit rate constraint; and (d) if the step of comparing the computed modified coding bit rate to the bit rate constraint does not yield a different result than the step of comparing the computed coding bit rate to the bit rate constraint, repeating steps (a) through (c) one or more times until the step of comparing the computed modified coding bit rate yields a different result than the step of comparing the computed coding bit rate.

9. The method of claim 8 wherein each iteration of the modifying step comprises modifying the assigned value of one of the quantization error parameters corresponding to a first one of the regions until said quantization error parameter corresponding to the first one of the regions reaches a limiting value, and wherein at least one iteration of the modifying step after said quantization error parameter corresponding to the first one of the regions reaches the limiting value comprises modifying the assigned value of one of the quantization error parameters corresponding to a second one of the regions.

10. The method of claim 9 wherein the limiting value of the quantization error parameter corresponding to the first one of the regions comprises a predetermined maximum allowable value.

11. The method of claim 9 wherein the limiting value of the quantization error parameter corresponding to the first one of the regions comprises a predetermined minimum allowable value.

12. The method of claim 9 wherein the limiting value of the quantization error parameter corresponding to the first one of the regions comprises a value having a difference from the value of a quantization error parameter corresponding to the second one of the regions equal to a predetermined maximum allowable difference.

13. An encoder for use in coding an image signal, the image signal representative of an image comprising a plurality of spatial regions, each spatial region comprising a bounded two-dimensional area of the image, each of the regions having one or more corresponding quantization error parameters associated therewith, the encoder comprising:

means for assigning a value to each quantization error parameter;

means for computing a coding bit rate for the image signal based on the values assigned to the quantization error parameters;

a comparator adapted to compare the computed coding bit rate to a bit rate constraint;

means for adjusting the assigned value of at least one of said quantization error parameters responsive to the comparator, at least one of the quantization error parameters corresponding to each of at least two of the spatial regions having different values resulting therefrom; and a coder, responsive to the adjusting means, the coder adapted to code each of the spatial regions based on the values assigned to the corresponding quantization error parameters.

14. The encoder of claim 13 wherein the coder comprises one or more scalar quantizers and wherein the quantization error parameters reflect step sizes of the scalar quantizers.

15. The encoder of claim 14 wherein the assigning means assigns a maximum value to at least one of the quantization error parameters.

16. The encoder of claim 14 wherein the assigning means assigns a minimum value to at least one of the quantization error parameters.

17. The encoder of claim 13 wherein the coder codes each region with a substantially uniform quantization error.

18. The encoder of claim 13 wherein the coder comprises means for coding a first portion of one of the regions with a first quantization error and means for coding a second portion of the one of the regions with a second quantization error, wherein the first quantization error and the second quantization error are unequal.

19. The encoder of claim 13 wherein the image signal is comprised in one frame of a sequence of frames, each of the frames comprising a corresponding image signal associated therewith, the encoder further comprising means for modifying the bit rate constraint responsive to the comparator, and wherein the coder codes one or more other image signals in addition to the image signal, the one or more other image signals having been selected for coding responsive to the modifying means.

20. The encoder of claim 13 wherein the adjusting means comprises:

(a) means for modifying the assigned value of one of the quantization error parameters;

(b) means, responsive to the modifying means, for computing a modified coding bit rate for the image signal based on the values assigned to the quantization error parameters;

(c) a comparator adapted to compare the computed modified coding bit rate to the bit rate constraint; and (d) means for repeating steps (a) through (c) zero or more times until the comparator adapted to compare the computed modified coding bit rate yields a different result than the comparator adapted to compare the computed coding bit rate.

21. The encoder of claim 20 wherein the modifying means comprises means for modifying the assigned value of one of the quantization error parameters corresponding to a first one of the regions until said quantization error parameter corresponding to the first one of the regions reaches a limiting value, and means for modifying the assigned value of one of the quantization error parameters corresponding to a second one of the regions after said quantization error parameter corresponding to the first one of the regions reaches the limiting value.

22. The encoder of claim 21 wherein the limiting value of the quantization error parameter corresponding to the first one of the regions comprises a predetermined maximum allowable value.

23. The encoder of claim 21 wherein the limiting value of the quantization error parameter corresponding to the first one of the regions comprises a predetermined minimum allowable value.

24. The encoder of claim 21 wherein the limiting value of the quantization error parameter corresponding to the first one of the regions comprises a value having a difference from the value of a quantization error parameter corresponding to the second one of the regions equal to a predetermined maximum allowable difference.

* * * * *